UNITED STATES PATENT OFFICE 2,427,708

CHEMICAL PRODUCTION OF OXYGEN

Eugene O. Brimm, Kenmore, N. Y., assignor to The Linde Air Products Company, a corporation of Ohio No Drawing. Application July 3, 1942, Serial No. 449,683

11 Claims. (Cl. 23—221)

This invention relates to a novel chemical process for extracting oxygen from a mixture of oxygen with inert gas, more particularly for separating and collecting gaseous oxygen of high purity from the atmosphere. The invention is also concerned with a novel chemical contact mass for use in the process. More particularly, the invention relates to improvements on the process of Du Motay and Marechal disclosed in United States Patent 70,705 of November 12, 1867.

The process of Du Motay et al. is performed by alternately passing air and steam through a closed retort over a hot alkali manganate or similar reaction mass having the ability to be oxidized by the passage of air thereover, and thereafter to be deoxidized and release gaseous oxygen during the passage of steam thereover. The reversible reaction theoretically is:

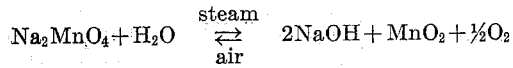

$$Na_2MnO_4 + H_2O \underset{air}{\overset{steam}{\rightleftarrows}} 2NaOH + MnO_2 + \tfrac{1}{2}O_2$$

Various reaction masses may be used in the process, as disclosed by Du Motay et al., including the manganates and permanganates of potassium, sodium, or barium, as well as the chromates and ferrates of these metals, and in general all metallic acids or oxides forming, with potassium, sodium, or barium, binary combinations capable of becoming super-oxidized, and also possessing the property of releasing their oxygen at a temperature more or less elevated when they are placed in the presence of a current of steam. During the passage of steam over the hot mass, the gaseous oxygen is collected while the residual steam is condensed and separated from the oxygen. Oxygen of 95% purity or better may be obtained by this process. Of course the nitrogen residue from the air phase of the cycle also may be collected, if this is desired.

The basic process of Du Motay et al. has not been commercially successful in competition with other methods of producing oxygen because of several disadvantages rendering the process economically unprofitable. One of the principal drawbacks of the Du Motay et al. process is the instability of the reaction mass, which deteriorates rapidly after being in service only a short time, with a resulting low oxygen production based on the quantities of air and steam passed over the mass. Moreover, the process consumes huge quantities of steam for the production of oxygen on a large scale, thus making the cost of operation prohibitive. Another serious disadvantage is the relatively great size and cost of the equipment and plant required for producing oxygen on a large scale, necessitating a large initial investment.

Several attempts have been made by subsequent investigators to improve the fundamental Du Motay et al. process to permit the production of oxygen economically. Development has been mainly aimed at improving the physical or chemical character of the reaction mass for better stability and greater efficiency of oxygen production. Among the best known of these improvements is that proposed by George Kaszner in United States Patent 1,015,566, of January 23, 1912. Kaszner teaches the addition to the alkali manganate mass of an alkali meta-plumbate, such as sodium meta-plumbate, for increased stability. Despite the alleged improvement in the stability of the reaction mass, however, there is no substantial increase in the efficiency of oxygen production based on the quantities of steam and air supplied to the mass, excessive quantities of steam being required for oxygen production on a large scale. Furthermore, experiments have shown that Kaszner's "Plumboxan" contact mass is quite unstable because of the gradual volatilization of lead compounds from the mass during operation at high temperatures.

The principal object of the present invention, therefore, is to provide a novel chemical process for extracting oxygen from a mixture of oxygen with inert gas, particularly for producing oxygen from the air without the disadvantages of the prior processes discussed above. Another object is the provision of a novel process for producing oxygen by the alternate passage of air and steam over a hot contact mass whereby improved yields of oxygen are obtained. Another object is the provision of such a process which will remain operative over a long period of time. Still another object is the provision of novel contact masses which give an improved combination of high oxygen yield and good stability when steam and air are passed alternately over the masses. Another object is to provide a novel process for preparing the novel contact mass so as to provide increased oxygen yields.

The above and other objects, and the novel features of the invention, will become apparent from the following detailed description:

Generally, the process of this invention comprises passing flowing streams alternately of air and steam over a hot solid manganate type contact mass which is a sintered material comprising complexes of manganese, oxygen, silicon, and an alkali metal. The mass has a composition and relationship of elements such as theoretically to form a double manganate-metasilicate salt $yX_2MnO_4.X_2SiO_3$ or $yX_2MnO_4.X_2SiO_3.X_2O$, wherein X is an alakli metal and $y$ is from 2 to 4. The alkali metal is in excess of the amount required in the double salt by an amount substantially just sufficient theoretically to combine with any other uncombined acidic materials in the mass. The mass is oxidized during the passage of air thereover, and the oxygen is subsequently liberated from the mass and passes off with residual steam during the steam phase of the process. The residual steam then is condensed and the gaseous oxygen collected for immediate or future use. The cycling of air and steam over the contact mass may be continued indefinitely as long as the contact mass remains reasonably stable. It has been found that with this process, wherein an oxide or salt of silicon is added to the mixture for producing a contact mass, greatly improved yields of oxygen are obtained coupled with a mass stability at least as good as that of the "Plumboxan" mass of the Kaszner patent, and better than that of the Du Motay simple manganate contact mass.

In one specific form of contact mass used in the process of the invention, just enough of the sodium or potassium hydroxide is added theoretically to react stoichiometrically with all of the oxide of manganese and all of the silicon compound to form, when sintered, sodium or potassium manganate and metasilicate. The quantity of the hydroxide added to react with the oxide of manganese is based on the assumption that the components react completely with one another to form the compounds $Na_2MnO_4$ or $K_2MnO_4$. The quantity of the hydroxide added to react with the oxide or salt of silicon is calculated on the assumption that the compounds $Na_2SiO_3$ or $K_2SiO_3$ are obtained. It is known, however, that in reality only a small part of the components react with one another to produce these definite compounds and the balance of the mass may consist of a heterogeneous mixture of complex and simple salts and oxides of manganese with salts and oxides of silicon. No exact chemical formula may be assigned to any mass because of this heterogeneity. For simplicity, however, such masses are usually termed "manganate" type masses.

The masses may be prepared with atomic ratios of anywhere between 2 and 4 atoms of manganese to 1 atom of silicon. For example, when preparing a contact mass on the basis of an atomic ratio of 2 to 1, the quantities of the components mixed together are based on the theoretical formation of a double manganate-metasilicate salt having the formula $2Na_2MnO_4.Na_2SiO_3$, although there is no evidence that such a compound actually is formed. For an atomic ratio of 4 to 1, the components are mixed together on the basis of the formula $4Na_2MnO_4.Na_2SiO_3$. Atomic ratios of 4 to 1 have been found to give the best results in practice.

In a typical example of the preparation of a contact mass, 30 grams of $SiO_2$ were mixed with 181.2 grams of $MnO_2$ (60.7% Mn) and 209 grams of NaOH (98% NaOH), and the mixture sintered at 1600° F. Samples of the resulting mass, having theoretically the formula $4Na_2MnO_4.Na_2SiO_3$ (based on the quantities of components added to form the mixture), were cycled with air and steam at about 1200° F. and at about 1290° F. for 10 minute cycles (5 minutes to each phase) at about atmospheric pressure. For equal weights of samples oxygen yields of 186 cc. and 195 cc. were obtained at 1200° F. and 1290° F., respectively.

In a modified form of contact mass, an excess of the oxidic compound of the alkali or alkaline earth metal is added to the mixture before sintering. The amount of the hydroxide which gives the best results is that required stoichiometrically to produce a compound having the theoretical formula $4Na_2MnO_4.Na_2SiO_3.Na_2O$, although there is no evidence that this compound is actually obtained. Better oxygen yields were obtained with silicon catalysts when the masses were prepared at 1470° F. than when they were prepared at 1830° F. or 2190° F.

The results with masses having various ratios of manganese to silicon, and the effect of excess sodium hydroxide on the masses, are illustrated in the following table, showing the results of tests made by alternately passing air and steam over equal weights of samples under similar conditions at 1290° F. and atmospheric pressure.

| Theoretical Formula | Atomic Ratio | Sintering Temperature | Oxygen Yield cc./Sample |
|---|---|---|---|
| | | °F. | |
| $2Na_2MnO_4.Na_2SiO_3$ | 6Na 2Mn 1Si | 1,690 | 210 |
| $4Na_2MnO_4.Na_2SiO_3$ | 10Na 4Mn 1Si | 1,600 | 222 |
| $4Na_2MnO_4.Na_2SiO_3.Na_2O$ | 12Na 4Mn 1Si | 1,530 | 182 |

The following table shows examples illustrating the superiority of compounds of silicon over several other compounds for addition to manganate contact masses. The contact masses were tested all under similar conditions by passing air and steam alternately over samples of equal weight at 1200° F. for 10 minute cycles (5 minutes to each phase) at about atmospheric pressure.

| Addition | Atomic Ratio In Mass | Sintering Temp.,°F. | Oxygen Yield (cc./sample) |
|---|---|---|---|
| Silicon | 6Na 2Mn 1Si | 1,690 | 155 |
| Do | 10Na 4Mn 1Si | 1,600 | 186 |
| Lead | 4Na 1Mn 1Pb | 1,700 | 32 |
| Do | 6Na 2Mn 1Pb | 1,740 | 59 |
| Do | 10Na 4Mn 1Pb | 1,740 | 55 |
| Bismuth | 5Na 2Mn 1Bi | 1,350 | 84 |
| Arsenic | 5Na 2Mn 1As | 2,140 | 6 |
| Tin | 6Na 2Mn 1Sn | 2,190 | 66 |
| Vanadium | 5Na 2Mn 1V | 2,080 | 12 |
| Tungsten | 6Na 2Mn 1W | 1,510 | 58 |
| Antimony | 5Na 2Mn 1Sb | 2,080 | 10 |
| Phosphorus | 5Na 2Mn 1P | 2,070 | 15 |

Not only were the yields of oxygen obtained when using a compound of silicon superior to the yields obtained with any of the oxides or salts of the other listed elements, but also the masses containing silicon were at least as stable as the other masses tested, and in some cases more stable.

The contact masses of the invention give improved results in the process for producing oxygen when the air and steam are maintained at or near atmospheric pressure. However, the results in some cases are even more startling in their superiority over prior known processes when the air and steam are maintained at pressures above 1½ atmospheres absolute, and preferably at higher pressures such as 75 lb./sq. in. gauge. When the process is so operated a marked increase in the stability of the contact mass is noted, the oxygen yield increases in direct proportion to the absolute atmospheres of pressure, and the quantity of steam required is greatly reduced.

In one example of the operation of the process with steam and air under pressure, one ton of manganese dioxide ore, containing 47.36% manganese, 11.74% available oxygen and 11.74% silica, was reduced in a direct fired gas furnace to an available oxygen content of 6.26%. This reduced ore was then mixed with sodium hydroxide to produce a mixture containing 42% sodium hydroxide and 58% reduced ore, and the mixture sintered at 1200° C. The resulting mass showed by chemical analysis a sodium to manganese ratio of 8 to 6, with sufficient excess sodium to react with the silica present.

A sample of the mass then was cycled with steam and air alternately at a temperature of 1200° F. and a pressure of 75 lb./sq. in., giving an oxygen yield of 0.52 cu. ft./hr. at a constant rate over a continuous period of twenty days.

No satisfactory theory has been developed to explain the superior results obtainable when oxides or salts of silicon are used with manganate type contact masses. Kaszner, in his Patent 1,015,566, advanced the theory that his plumbate reacted with free alkali liberated during the steam phase of the process and prevented segregation of alkali from the rest of the mass. There is no strong evidence, however, that this theory is correct. Moreover, there is no evidence that the oxides or salts used according to this invention act in the same way as does the plumbate of Kaszner, irrespective of whether Kaszner's theory is or is not correct.

What is claimed is:

1. A sintered solid manganate type contact mass characterized by its ability to be deoxidized and oxidized alternately by steam and air, respectively, said mass being a sintered material comprising complexes of manganese, oxygen, silicon, and sodium, said mass having a composition and relationship of the elements corresponding approximately to 4 mols of $Na_2MnO_4$ to 1 mol of $Na_2SiO_3$ to 1 mol of $Na_2O$.

2. A process for extracting oxygen from a mixture of oxygen with inert gas comprising alternately passing flowing streams of said mixture and steam into contact with a sintered solid hot manganate type contact mass characterized by its ability to be deoxidized and oxidized alternately by steam and oxygen, respectively, said mass being a sintered material comprising complexes of manganese, oxygen, silicon, and sodium, said mass having a composition and relationship of the elements corresponding approximately to 4 mols of $Na_2MnO_4$ to 1 mol of $Na_2SiO_3$ to 1 mol of $Na_2O$, said oxygen being liberated from said mass during the passage of steam.

3. A process for producing a contact mass characterized by its ability to be deoxidized and oxidized alternately by steam and air, respectively, which process comprises sintering together at a temperature below 1830° F. an intimate mixture of sodium hydroxide, an oxide of manganese, and a compound selected from the group consisting of oxides and salts of silicon in proportions such as to form theoretically $4Na_2MnO_4.Na_2SiO_3.Na_2O$ 4. A solid manganate type contact mass characterized by its ability to be deoxidized and oxidized alternately by steam and air, respectively, said mass being a sintered material comprising complexes of manganese, oxygen, silicon, and an alkali metal, said material having a composition and relationship of elements such as theoretically to form a double manganate-metasilicate salt $yX_2MnO_4.X_2SiO_3$, wherein X is an alkali metal and $y$ is from 2 to 4, said alkali metal being in excess of the amount required in said double salt by an amount substantially just sufficient theoretically to combine with the other uncombined acidic materials in the mass.

5. A solid manganate type contact mass characterized by its ability to be deoxidized and oxidized alternately by steam and air, respectively, said mass being a sintered material comprising complexes of manganese, oxygen, silicon, and an alkali metal, said material having a composition and relationship of elements such as theoretically to form a double manganate-metasilicate salt $4X_2MnO_4.X_2SiO_3$, wherein X is an alkali metal, said alkali metal being in excess of the amount required in said double salt by an amount substantially just sufficient theoretically to combine with the other uncombined acidic materials in the mass.

6. A solid manganate type contact mass characterized by its ability to be deoxidized and oxidized alternately by steam and air, respectively, said mass being a sintered material comprising complexes of manganese, oxygen, silicon, and sodium, said material having a composition and relationship of elements such as theoretically to form a double manganate-metasilicate salt $yNa_2MnO_4.Na_2SiO_3$, wherein $y$ is from 2 to 4, said sodium being in excess of the amount required in said double salt by an amount substantially just sufficient theoretically to combine with the other uncombined acidic materials in the mass.

7. A solid manganate type contact mass characterized by its ability to be deoxidized and oxidized alternately by steam and air, respectively, said mass being a sintered material comprising complexes of manganese, oxygen, silicon, and potassium, said material having a composition and relationship of elements such as theoretically to form a double manganate-metasilicate salt $yK_2MnO_4.K_2SiO_3$, wherein $y$ is from 2 to 4, said potassium being in excess of the amount required in said double salt by an amount substantially just sufficient theoretically to combine with the other uncombined acidic materials in the mass.

8. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, silicon, and an alkali metal, said material having a composition and relationship of elements such as theoretically to form a double manganate-metasilicate salt $yX_2MnO_4.X_2SiO_3$, wherein X is an alkali metal and $y$ is from 2 to 4, said alkali metal being in excess of the amount required in said double salt by an amount substantially just sufficient theoretically to combine with the other uncombined acidic materials in the mass.

9. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, silicon, and an alkali metal, said material having a composition and relationship of elements such as theoretically to form a double manganate-metasilicate salt $4X_2MnO_4.X_2SiO_3$ wherein X is an alkali metal, said alkali metal being in excess of the amount required in said double salt by an amount substantially just sufficient theoretically to combine with the other uncombined acidic materials in the mass.

10. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, silicon, and sodium, said material having a composition and relationship of elements such as theoretically to form a double manganate-metasilicate salt $yNa_2MnO_4.Na_2SiO_3$ wherein $y$ is from 2 to 4, said sodium being in excess of the amount required in said double salt by an amount substantially just sufficient theoretically to combine with the other uncombined acidic materials in the mass.

11. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, silicon, and potassium, said material having a composition and relationship of elements such as theoretically to form a double manganate-metasilicate salt $yK_2MnO_4.K_2SiO_3$ wherein $y$ is from 2 to 4, said potassium being in excess of the amount required in said double salt by an amount substantially just sufficient theoretically to combine with the other uncombined acidic materials in the mass.

EUGENE O. BRIMM.

REFERENCES CITED

The following references are of record in the file of this patent:

UNITED STATES PATENTS

| Number | Name | Date |
| --- | --- | --- |
| 500,697 | Webb | July 4, 1893 |
| 515,443 | Parkinson | Feb. 27, 1894 |
| 1,124,304 | Danckwardt | Jan. 12, 1915 |
| 1,303,911 | Jorgensen | May 20, 1919 |
| 1,694,122 | Jaeger | Dec. 4, 1928 |
| 2,086,507 | Larsen | July 6, 1937 |
| 2,154,128 | Jacobs | Apr. 11, 1939 |
| 2,176,774 | Sweet | Oct. 17, 1939 |

FOREIGN PATENTS

| Number | Country | Date |
| --- | --- | --- |
| 14,925 | Great Britain | 1890 |
| 3,034 | Great Britain | 1891 |
| 13,959 | Great Britain | 1895 |

OTHER REFERENCES

Mellor, Comprehensive Treatise on Inorganic and Theoretical Chemistry, Longmans, N. Y., 1932, vol. 12, p. 246.

Phillips, "Mineralogy," The Macmillan Co., New York, 1912, pp. 501 and 502.